United States Patent Office 3,067,796
Patented Dec. 11, 1962

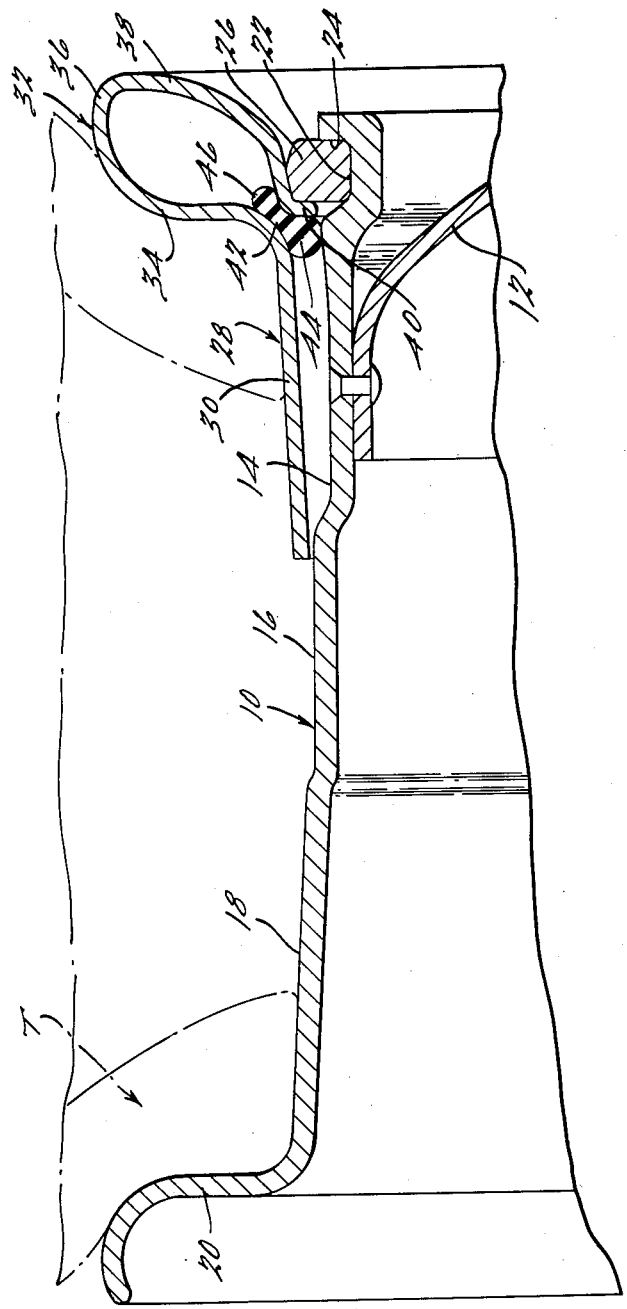

3,067,796
TUBELESS TIRE WHEEL RIM
Rupert L. Atkin, Grosse Pointe Woods, Mich., assignor to Kelsey-Hayes Company, Detroit, Mich., a corporation of Delaware
Filed Jan. 9, 1961, Ser. No. 81,480
5 Claims. (Cl. 152—410)

This invention relates to rim assemblies for supporting tubeless pneumatic tires and particularly to a rim assembly having a removable side ring for supporting and retaining one side wall and bead of the tire in position on the rim base wherein an annular space or gap is left between the side ring and the base which is sealed by a resilient sealing ring to retain inflationary air within the tire.

It is an object of the present invention to provide a rim assembly of the above type in which the sealing ring is interengaged with the side ring so as to be held firmly in place during installation of the side ring on the base and during use of the rim assembly.

It is another object of the present invention to provide a rim assembly of the above character in which the sealing ring is prevented from extruding through the gap in the usual split locking ring utilized to hold the side ring on the base and is protected from possible damage by a tool used to pry the lock ring off of the rim base.

It is another object of the present invention to provide a rim assembly of the above character in which the force of inflationary air pressure and other forces applied to the side wall of the tire are transmitted through the sealing ring to the lock ring and are utilized to increase the pressure with which the sealing ring seals against the rim base.

It is still another object of the present invention to provide a rim assembly of the above character which is convenient and simple to assemble, which maintains a positive and firm seal between the rim base and the removable side ring and which is inexpensive of construction.

These and other objects of the present invention will be apparent from the following detailed description taken in conjunction with the accompanying drawing which is a fragmentary transverse sectional view through a rim assembly embodying the principles of the present invention.

In the drawing, the numeral 10 designates an annular endless rim base which is riveted or otherwise fastened to a conventional wheel disk or body 12. The rim base includes a circumferentially extending surface 14 which is illustrated as being adjacent the right-hand side of the rim on the drawing, a central cylindrical circumferentially extending surface 16 of slightly greater diameter than the surface 14, and a circumferentially extending surface 18 which tapers slightly outwardly toward the left-hand side of the rim and merges into a tire retaining flange 20. The surface 18 forms a bead seat for supporting the bead of one side wall of a tire T, while the flange 20 prevents the movement of said side wall off of the rim base. A gutter 22 is formed adjacent the opposite side of the rim base and is defined on its axially outer side by a shoulder 24. Seated within the gutter 22 is an annular split lock ring 26 which serves to retain in place a removable endless side ring, which is sleeved over the rim base at the right-hand side thereof.

The side ring 28 includes an annular circumferentially extending bead seat portion 30, which spacedly surrounds and confronts the rim base surface 14, leaving a gap therebetween. The bead seat 30 serves to support the other bead of the tire T and merges into a tire retaining flange 32 having a first wall portion 34 engageable with the other side wall of the tire T to hold the same in place. The side ring 28 is a so-called tubular side ring, with the flange 32 being of a generally U-shaped or reversely bent cross-section. The first wall portion 34, while being of generally arcuate shape, extends generally radially outwardly and merges into a reversely bent or loop portion 36, which in turn merges with a second wall portion 38 having a radially inwardly extending lip or flange 40 at the end thereof. A portion of the side wall 38 is shaped to conformably seat against the upper surface of the lock ring 26. A portion of the second wall portion 38 adjacent the flange 40 is closely spaced from the first wall portion 34 and clamped between said walls at this location is an endless resilient sealing ring 42.

It will be seen that the sealing ring 42 is of such cross-sectional shape as to provide a first enlarged bead portion 44 at the radially inner end thereof and another enlarged bead portion 46 at the other end thereof, with the ring being of a reduced thickness or grooved outer shape intermediate the enlarged portions 44 and 46 which is conformably engaged by the wall portions 34 and 38 to prevent slippage of the sealing ring out of its intended position in the side ring. The bead 44 seats against and seals with the base 10 at the surface 14 adjacent the gutter 22. The side ring lip or flange 40 is disposed between the bead portion 44 and the lock ring 26 and thus prevents extrusion of the sealing ring through the gap in the lock ring under inflationary air pressure and also protects the sealing ring 42 from tools utilized to pry the lock ring out of the gutter. It will also be seen that inflationary air pressure within the tire exerts a laterally outward force on the tire side walls, tending to displace the side ring 28 axially outwardly. This force is transmitted through the wall portion 34 to the sealing ring 42 and, in turn, to the outer wall portion 38 and its flange 40. This produces abutment of the flange 40 against the lock ring 26, which engages the shoulder 24 of the rim base 10 and is thus held against displacement off of the rim.

When it is desired to remove the tire from the rim, the tire is first deflated so that the side ring 28 may be moved in a direction toward the opposite flange 20 to permit the lock ring 26 to be expanded and removed from the gutter. Thereafter, the side ring 28 may be simply sleeved off of the rim base, as may be the tire T. Upon assembly of the structure, it may be desirable to first apply a small amount of lubricant to the rim base surface 14 in order to facilitate sliding movement of the sealing ring 42 along said surface as the side ring is slid inwardly a sufficient amount to permit the installation of the lock ring 26. The side ring 28 and sealing ring 42 are, of course, first assembled together by any convenient means. For example, the side ring 28 may be finally formed and the sealing ring 42 thereafter press fit in place, or the side ring walls 34 and 38 may be bent to their final position with the sealing ring 42 in place between them.

From the foregoing, it will be seen that the structure of the present invention assures that the ultimate position of the sealing ring 42 will be positively located and that the sealng ring will always be in the desired position to maintain a smooth, tight fit between the side ring and the rim base to prevent the loss of the inflationary air within the tire.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:
1. A rim assembly for a tubeless tire including an endless rim base, a locking ring detachably engaged with said rim base at one side thereof, a removable side ring sleeved over said rim base and held thereon by said locking ring, said side ring having a tire retaining flange provided with spaced integrally connected wall portions, an endless sealing ring clamped between said wall portions and having a portion projecting radially inwardly from said wall portions engageable with a confronting portion of said rim base for sealing between said side ring and said rim base.

2. A rim assembly for a tubeless tire including an endless rim base, a locking ring detachably engaged with said rim base at one side thereof, a removable side ring sleeved over said rim and held thereon by said locking ring, said side ring having a tire retaining flange provided with spaced wall portions, an endless sealing ring clamped between said wall portions and sealingly engaging a confronting portion of said rim base, said sealing ring having a cross-sectional shape defining spaced portions of enlarged area separated by an intermediate portion of reduced thickness, said flange wall portions conformably engaging said sealing ring at said intermediate portion, whereby movement of said sealing ring out of clamped engagement with said wall portions is restrained.

3. A rim asembly for a tubeless tire including an endless rim base; a locking ring detachably engaged with said rim base at one side thereof; a removable side ring sleeved over said rim and held thereon by said locking ring, said side ring having a tire retaining flange provided with a circumferentially and axially extending bead seat, and a tire retaining flange having a first wall portion merging with said bead seat and a second wall portion reversely bent with respect to said first wall portion so as to spacedly confront said first wall portion; and an endless sealing ring sealingly engaging said rim base and clamped between said wall portions so as to be fixedly held with respect to said side ring.

4. A rim assembly for a tubeless tire including an endless rim base, a locking ring detachably engaged with said rim base at one side thereof, a removable side ring sleeved over said rim and held thereon by said locking ring, said side ring having a circumferentially and axially extending bead seat and a tire retaining flange provided with a first wall portion merging with said bead seat and a second wall portion reversely bent with respect to said first wall portion so as to spacedly confront said first wall portion, a radially inwardly projecting lip on said second wall portion axially opposite to and engaging said locking ring to prevent movement of said side ring off of said rim base, and a sealing ring sealingly engaging said rim base and held between said wall portions so as to be fixedly positioned with respect to said side ring.

5. A rim assembly for a tubeless tire including an endless rim base having an integrally formed tire retaining flange on one side thereof and a gutter on the axially opposite side thereof, a locking ring detachably seated in said gutter, a removable side ring sleeved over said rim base adjacent said gutter and held on said rim base by said locking ring, said side ring having a bead seat and a tire retaining flange extending generally radially outwardly from said bead seat, said side ring flange being provided with inner and outer spaced wall portions, the inner of said wall portions merging into said bead seat and the outer of said wall portions being joined to said inner wall portion at the radially outer end thereof and having a radially inwardly extending lip axially opposite to and engaging said locking ring, and an endless resilient sealing ring held in press fit relation between said wall portions and sealingly engaging said rim base adjacent said lip.

References Cited in the file of this patent
FOREIGN PATENTS
162,800   Sweden _____ Apr. 1, 1958